March 5, 1963
H. LOWENTHAL
3,079,841
SYMMETRICAL HIGH SPEED OBJECTIVE
Filed April 22, 1960
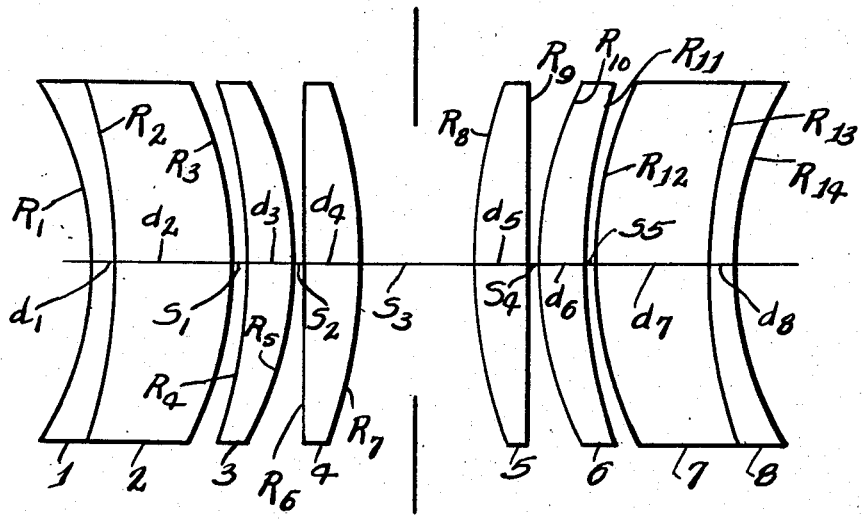
Inventor.
Herman Lowenthal.
By. Zabel Baker York Jones & Dithmar
Attorneys.

3,079,841
SYMMETRICAL HIGH SPEED OBJECTIVE
Herman Lowenthal, Chicago, Ill., assignor to General Scientific Corporation, Chicago, Ill., a corporation of Illinois
Filed Apr. 22, 1960, Ser. No. 23,982
9 Claims. (Cl. 88—57)

This invention relates to a symmetrical high speed objective, and particularly to high speed lens systems for magnification ratios of the order of unity.

Lens systems having such a low magnification are generally used for copying and related applications. As a rule such systems have narrow fields and comparatively low speeds.

Symmetrical objectives when used at about unity magnification inherently have certain advantages. Thus such objectives have inherent in them corrections for coma and distortion. Attempts have been made to increase the speed of such symmetrical objectives. It has been suggested that crystalline materials such as calcium fluoride be used for the convergent elements. This material has relative partial dispersions which are greater than conventional optical glasses having generaly similar Abbe V numbers. In addition non-spherical lens surfaces have also been used in such objectives.

This invention provides a symmetrical objective using conventional optical glasses having spherical curved surfaces. Objectives according to the invention have substantially higher speeds than hitherto have been obtainable in a simple symmetrical objective.

A substantial advantage of the new objectives embodying the present invention is that all lenses on one side of the stop have radii of the same algebraic sign, observing the usual conventions. Thus a lens on one side of the stop and the corresponding lens on the other side of the stop have their respective centers of curvature also on opposite sides of the stop. More specifically, the radius of curvature for each lens surface is on the same side of the stop as the lens itself. Thus the absolute values of the radii on one side of the stop are the same as those on the other side of the stop. When the algebraic plus and minus signs are considered, the sum of all radii add to zero.

The relationship set forth above has important practical and theoretical results. The new objective has more complete correction than is possible with earlier symmetrical objectives without relying upon such expensive expedients as crystalline lens material and aspherical surfaces. This is due to the fact that the surface coefficients of the spherical aberration of the new objective add to absolute zero while the Petzval sum is substantially zero, this minute departure from zero indicating a slight over-correction. However this over-correction is compensated for by the fact that the only third order sum which differs from zero relates to astigmatism and this third order sum which has a very small absolute value comes out with the algebraic sign opposite to the algebraic sign of the Petzval sum. Thus the objective is corrected for both tangential and sagittal curvature of the field. The new objective has full correction for coma, distortion and chromatic difference of magnification.

For a complete disclosure of the invention, reference will now be made to the drawing wherein the single FIGURE shows diagrammatically a symmetrical objective embodying the present invention.

The figure in the drawing is in accord with usual convention with the light coming from the left. Lens 1 and 2 form a compound dispersive doublet and is followed by collective single meniscus lens 3 and then by collective plano convex lens 4. The lens group on the other side of stop space $S_3$ is symmetrical with the lens group thus far described, it being understood that lens 5 corresponds to lens 4, lens 6 corresponds to lens 3, and so forth.

The data for the objective illustrated in the drawing is set forth as follows:

The objective has a speed of F/2 with unity magnification. The effective focal length is 1.000 while the back focal length is 0.784. Half angle 10°.

| | |
|---|---|
| $R_1 = -R_{14} = -.4075$ | $d_1 = d_{13} = .063$ |
| $R_2 = -R_{13} = -1.5000$ | $d_2 = d_7 = .200$ |
| $R_3 = -R_{12} = -.7895$ | $d_3 = d_6 = .060$ |
| $R_4 = -R_{11} = -5.4910$ | $d_4 = d_5 = .060$ |
| $R_5 = -R_{10} = -1.2380$ | $S_1 = S_5 = .003$ |
| $R_6 = -R_9 = $ Infinity | $S_2 = S_4 = .003$ |
| $R_7 = -R_8 = -1.5830$ | $S_3 = .140$ |

Glass Constants

| Lens | N (refractive index) | V (Abbe number) |
|---|---|---|
| 1 and 8 | 1.689 | 30.9 |
| 2 and 7 | 1.651 | 55.8 |
| 3 and 6 | 1.620 | 60.0 |
| 4 and 5 | 1.620 | 60.0 |

It will be noted that starting from the stop, the indices of refraction (N) for the different glasses are in ascending order. The reverse relation is true for the V numbers.

The stronger (having the smaller radius of curvature) radii on the collective members (lenses 4, 5, 3, 6, 2 and 7) are in descending order starting from the stop. Thus $R_8$, $R_{10}$ and $R_{12}$ are successively smaller.

The stronger radii ($R_7$ and $R_3$) of the first and third elements from the stop (lenses 4 and 2) have about a 2 to 1 ratio.

The stronger radius ($R_5$) of the second element from the stop is intermediate the above mentioned stronger radii of the first and third elements from the stop.

The concave radii ($R_6$, $R_4$ and $R_2$) are also in descending order from the stop insofar as magnitude is concerned. This is related to chromatic correction.

The focal length of the single collective elements, lenses 3 and 4, are substantially equal, being 2.56 with the differences going to the third figures beyond the decimal point. It is understood that lenses 5 and 6 have the same relationship.

At the same time the total focal length of the symmetrical half lens (lenses 5 to 8 inclusive for one side of the stop) is 2.54. This shows that the plus power (power equals reciprocal of focal length) of the meniscus lens 6 balances the minus power of compound lens 7 and 8 to add up to zero. This provides correction for aberration while having no effect on the focal length of plano convex lens 5 in the system.

The thickness of plano convex lens 5 (and 4), single and collective meniscus lens 6 (and 3) and compounded dispersive lens 8 (and 1) are very close to being the same (.060 and .063). The thickness of the compound collective lens 7 (and 2) is greater than the combined thickness of the three elements (5, 6 and 8) referred to previously.

From the above description it is thought that the construction and advantages of this invention will be readily apparent to those skilled in the art. Various changes in detail may be made without departing from the spirit or losing the advantages of the invention as limited in the appended claims.

Having thus described the invention, what I claim as new and desire to secure by Letters Patent is:

1. A symmetrical high speed objective comprising two lens groups on opposite sides of a central airspace, each lens group comprising a collective plano convex lens adjacent the airspace, a collective single meniscus lens adjacent said plano convex lens, the focal lengths of said collective plano convex lens and said collective single meniscus lens being 2.56 and a compound dispersive meniscus lens adjacent said single meniscus lens, said compound dispersive lens including a collective lens and a dispersive lens, all centers of curvature for the lens surfaces of the lens group on one side of the central airspace lying on that side of said airspace, the focal lengths of both lens groups being 2.54 whereby the plus power of each said collective single meniscus lens and the minus power of each said compound dispersive meniscus lens substantially total zero when added algebraically and said two lenses function only as aberration correctional elements.

2. The objective of claim 1 wherein the thicknesses of said plano convex lens, said single meniscus lens and said compounded dispersive lens are substantially equal, and the thickness of said compounded collective lens is greater than the sum of the thicknesses of the aforesaid first three lens elements.

3. The objective of claim 1 wherein the length of said central airspace is 0.140 times the focal length of the objective.

4. The objective of claim 1 wherein the indices of refraction for the respective lens elements of different glass in order starting from the central airspace are ascending and the V numbers thereof are descending.

5. The objective of claim 1 wherein the indices of refraction for the respective lens elements of different glass in order starting from the central airspace are 1.620, 1.651 and 1.689 and the V numbers thereof are 60.0, 55.8 and 30.9.

6. The objective of claim 1 wherein the stronger radii on the respective collective elements in each lens group in order starting from the central airspace are 1.583, 1.238 and 0.7895 times the focal length of the objective.

7. The objective of claim 1 wherein the stronger radii of said plano convex lens and said compounded collective lens have a ratio of substantially 2:1, and the stronger radius of said single meniscus lens is between the aforesaid two stronger radii in magnitude.

8. The objective of claim 1 wherein the concave radii of said plano convex lens, said single meniscus lens and said collective lens of said compound dispersive lens are respectively infinity, 5.491 and 1.500 times the focal length of the objective.

9. A symmetrical high speed objective of speed F/2 with unity magnification, focal length of 1.000, back focal length of 0.784 and 10 degree half angle having substantially the following specifications:

| | |
|---|---|
| $R_1 = -R_{14} = -.4075$ | $d_1 = d_8 = .063$ |
| $R_2 = -R_{13} = -1.5000$ | $d_2 = d_7 = .200$ |
| $R_3 = -R_{12} = -.7895$ | $d_3 = d_6 = .060$ |
| $R_4 = -R_{11} = -5.4910$ | $d_4 = d_5 = .060$ |
| $R_5 = -R_{10} = -1.2380$ | $S_1 = S_5 = .003$ |
| $R_6 = -R_9 = $ infinity | $S_2 = S_4 = .003$ |
| $R_7 = -R_8 = -1.5830$ | $S_3 = .140$ |

*Glass Constants*

| Lens | N (refractive index) | V (Abbe number) |
|---|---|---|
| 1 and 8 | 1.689 | 30.9 |
| 2 and 7 | 1.651 | 55.8 |
| 3 and 6 | 1.620 | 60.0 |
| 4 and 5 | 1.620 | 60.0 |

Where the lens elements are numbered from front to rear of the objective, N is the refractive index for the D line, V is the conventional dispersive index, $R_1$–$R_{14}$ are the radii of curvature of the lens surfaces numbered from front to rear, the + and − signs indicating surfaces respectively convex and concave to the front, $d_1$–$d_8$ are the lens thicknesses and $S_1$–$S_5$ are the axial separations, both numbered from front to rear.

References Cited in the file of this patent
UNITED STATES PATENTS 2,814,969    Kohler                 Dec. 3, 1957
2,893,290    Miles                  July 7, 1959